US010852234B2

(12) United States Patent
Dodson

(10) Patent No.: US 10,852,234 B2
(45) Date of Patent: Dec. 1, 2020

(54) ATTENUATED TOTAL REFLECTION CRYSTAL FABRICATED FROM DIAMOND MATERIAL

(71) Applicant: ELEMENT SIX TECHNOLOGIES LIMITED, Didcot (GB)

(72) Inventor: Joseph Dodson, Didcot (GB)

(73) Assignee: Element Six Technologies Limited, Didcot (GB)

( * ) Notice: Subject to any disclaimer, the term of this patent is extended or adjusted under 35 U.S.C. 154(b) by 31 days.

(21) Appl. No.: 16/306,623

(22) PCT Filed: Jul. 3, 2017

(86) PCT No.: PCT/EP2017/066517
§ 371 (c)(1),
(2) Date: Dec. 3, 2018

(87) PCT Pub. No.: WO2018/007329
PCT Pub. Date: Jan. 11, 2018

(65) Prior Publication Data
US 2019/0302020 A1    Oct. 3, 2019

(30) Foreign Application Priority Data
Jul. 4, 2016 (GB) .................................. 1611651.9

(51) Int. Cl.
*G01N 21/35* (2014.01)
*G01N 21/552* (2014.01)
(52) U.S. Cl.
CPC ........... *G01N 21/552* (2013.01); *G01N 21/35* (2013.01)
(58) Field of Classification Search
CPC ............ H04N 5/33; H04N 5/30; G01N 21/35; G01N 21/552
See application file for complete search history.

(56) References Cited

U.S. PATENT DOCUMENTS 5,200,609 A * 4/1993 Sting .................... G01N 21/552
                                                          250/226
5,986,768 A   11/1999 Pipino
(Continued)

FOREIGN PATENT DOCUMENTS

EP    0516481 A2   12/1992
EP    0529999 A2    3/1993

OTHER PUBLICATIONS

International Patent Application No. PCT/EP2017/066517, International Search Report and Written Opinion dated Oct. 5, 2017, 19 pages.
(Continued)

*Primary Examiner* — David P Porta
*Assistant Examiner* — Mamadou Faye
(74) *Attorney, Agent, or Firm* — Dean W. Russell; Clark F. Weight; Kilpatrick Townsend & Stockton LLP

(57) ABSTRACT

An attenuated total reflection (ATR) crystal (10) for ATR spectroscopy of a sample to be analysed. The ATR crystal is formed of a diamond material and configured to have an inlet surface (12) for an infrared analysis beam, an outlet surface (14) for the infrared analysis beam, and a working surface (16) for contacting the sample to be analysed. The ATR crystal (10) is in the form of a chamfered cylinder comprising two flat chamfered side walls forming the inlet and outlet surfaces (12, 14), and an end surface of the chamfered cylinder forming the working surface (16). The analysis beam can be directed through the inlet surface (12) to an inner side of the working surface (16) in contact with the sample to be analysed and internally reflected at the inner side of the working surface (16) in contact with the sample to be analysed such that the analysis beam passes out of the ATR crystal through the outlet surface (14). The working surface (16) is convexly curved.

5 Claims, 4 Drawing Sheets

(56) References Cited

U.S. PATENT DOCUMENTS

| | | | | |
|---|---|---|---|---|
| 6,141,100 | A | * 10/2000 | Burka | G01J 3/2823 |
| | | | | 250/339.11 |
| 2015/0192532 | A1 | * 7/2015 | Clevenson | G01R 33/323 |
| | | | | 324/304 |
| 2016/0139047 | A1 | 5/2016 | Geiger et al. | |

OTHER PUBLICATIONS

United Kingdom Patent Application No. GB1611651.9, Combined Search and Examination Report dated Nov. 23, 2016, 7 pages.
United Kingdom Patent Application No. GB1710641.0, Combined Search and Examination Report dated Nov. 21, 2017, 5 pages.

* cited by examiner

Fig 5
(a) 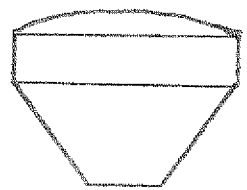
(b) 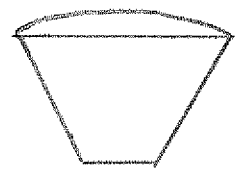
(c) 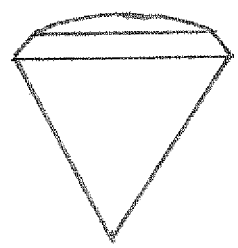
(d) 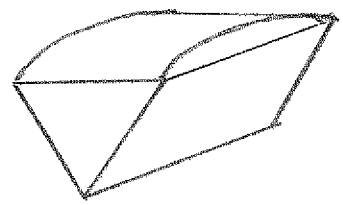

ATTENUATED TOTAL REFLECTION CRYSTAL FABRICATED FROM DIAMOND MATERIAL

FIELD

The present invention relates to an attenuated total reflection (ATR) crystal fabricated from diamond material for ATR infrared spectroscopy.

BACKGROUND

Attenuated total reflection (ATR) spectroscopy is an analysis technique which enables samples to be examined directly in the solid or liquid state. A beam of infrared light is passed through an ATR crystal in such a way that it reflects off an internal surface of the ATR crystal in contact with a sample to be analysed. This reflection forms an evanescent wave which extends into the sample. The penetration depth into the sample is typically between 0.5 and 2 micrometres, with the exact value being determined by the wavelength of light, the angle of incidence, and the indices of refraction for the ATR crystal and the medium being examined. The number of reflections may be varied by varying the angle of incidence and the geometry of the ATR crystal. The infrared beam is then collected by a detector after it exits the ATR crystal.

The evanescent effect requires that the ATR crystal is made of an optical material with a higher refractive index than the sample being studied. In the case of a solid sample, the ATR crystal and the sample are pressed together. An intimate contact between the ATR prism and the sample is desired for best results. The excellent optical and mechanical properties of diamond material make it an ideal material for ATR spectroscopy, particularly when studying very hard solids.

Various geometries of ATR crystals are available. The shape of the ATR crystal will depend on the type of spectrometer and nature of the sample to be analysed. Typical ATR crystal geometries include prisms, truncated prisms, chamfered rectangular blocks, chamfered cylinders and variations thereof. Common features of these geometries include a flat working surface which is pressed against the sample to be analysed and angled or chamfered sides which provide entry and exit surfaces for the infrared analysis beam such that the beam can be directed to the working surface in contact with the samples and then be internally reflected out of the ATR crystal to a detector.

It is an aim of the present invention to provide an improved geometry for a diamond ATR crystal.

SUMMARY OF INVENTION

According to a first aspect of the present invention there is provided an attenuated total reflection (ATR) crystal for ATR spectroscopy of a sample to be analysed,
  the ATR crystal being formed of a diamond material, and configured to have an inlet surface for an infrared analysis beam, an outlet surface for the infrared analysis beam, and a working surface for contacting the sample to be analysed, wherein the ATR crystal is in the form of a chamfered cylinder comprising two flat chamfered side walls forming the inlet and outlet surfaces, and an end surface of the chamfered cylinder forming the working surface;
  the inlet surface, the outlet surface and the working surface being configured such that in use the analysis beam can be directed through the inlet surface to an inner side of the working surface in contact with the sample to be analysed and internally reflected at the inner side of the working surface in contact with the sample to be analysed such that the analysis beam passes out of the ATR crystal through the outlet surface, and
  wherein the working surface is convexly curved.

According to a second aspect of the present invention there is provided an ATR spectrometer comprising an infrared beam source, an ATR crystal according to the first aspect of the invention, and a detector.

BRIEF DESCRIPTION OF THE DRAWINGS

For a better understanding of the present invention and to show how the same may be carried into effect, embodiments of the present invention will now be described by way of example only with reference to the accompanying drawings, in which:

FIGS. 5(a) to 5(d) illustrate several alternative ATR crystal geometries according to embodiments of the invention.

DETAILED DESCRIPTION

Figure 1:
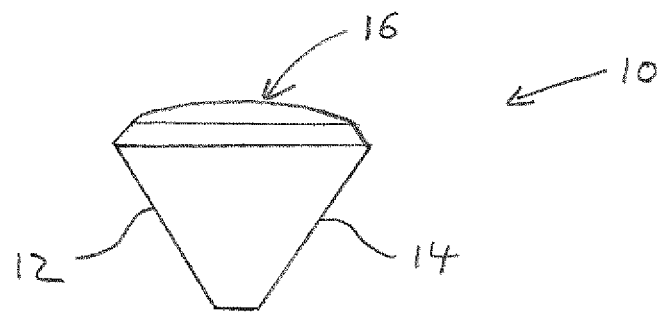
FIG. 1 illustrates a side view of an ATR crystal according to an embodiment of the invention.
Figure 2:
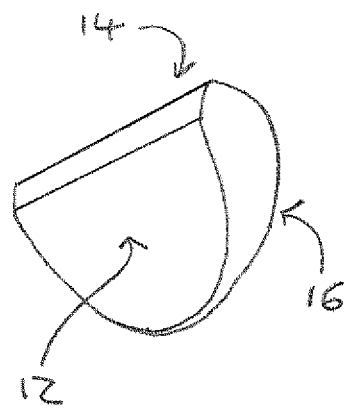
FIG. 2 illustrates a perspective view of the ATR crystal of FIG. 1.

FIGS. 1 and 2 illustrate side and perspective views of a diamond ATR crystal 10 according to an embodiment of the invention. The ATR crystal 10 is configured to have an inlet surface 12 for an infrared analysis beam, an outlet surface 14 for the infrared analysis beam, and a working surface 16 for contacting the sample to be analysed. The inlet surface 12, the outlet surface 14 and the working surface 16 are configured such that in use the analysis beam can be directed through the inlet surface 12 to an inner side of the working surface 16 in contact with the sample to be analysed and internally reflected at the inner side of the working surface 16 in contact with the sample to be analysed such that the analysis beam passes out of the ATR crystal 10 through the outlet surface 14.

A key modification to the diamond ATR crystal is that the working surface has been processed to be curved rather than having a conventional flat configuration. One of the advantages of using diamond for ATR crystals is that diamond is very hard and thus can be pressed against samples to be analysed without being damaged. However, diamond is very rigid and it has been realized that when a flat working surface of a diamond ATR crystal is pressed against a sample to be analysed, a central region of the flat working surface of diamond material may not form an intimate contact with the sample. For example, this may be the case when the sample surface is not precisely flat, has a concave geometry, or otherwise has a more complex geometry which can result in peripheral portions of the diamond working surface contacting the sample in a manner which prohibits a central region of the diamond working surface from intimately contacting the sample. If the region of the diamond working surface which is addressed by an analysis beam is not in intimate contact with the sample then the analysis will not be optimal.

In light of the above, the present invention provides a diamond ATR crystal with a curved working surface. The curved working surface protrudes outwards compared to a flat working surface (i.e. convex) such that a region of the working surface which is to be addressed by an analysis beam can be more reliably placed into intimate contact with a sample. Furthermore, since diamond is extremely hard it can effectively be pressed into the sample material in this curved configuration without significantly deforming or damaging the ATR crystal.

For many applications only a slight convex curvature of the working surface is required to significantly improve the reliability of achieving a good contact between the working surface of the diamond ATR crystal and the sample to be analysed. As such, the working surface may have a relatively large radius of curvature relative to the size of the ATR crystal, e.g. greater than 5 mm, 10 mm, 13 mm, or 15 mm and/or less than 200 mm, 150 mm, 100 mm, 50 mm, 30 mm, or 20 mm and/or within a range formed by any combination of these values. This configuration can be more readily processed into the diamond component when compared with more highly curved surfaces and also can have the advantage of not unduly deforming the sample which is being analysed when the ATR prism is pressed against the sample. The optimal radius of curvature within the aforementioned ranges will depend on the size of the ATR crystal. In practice ATR crystals will usually have a diameter in a range 1 to 5 mm, more usually 2 to 4 mm.

Another way of defining the convexly curved working surface of the ATR crystal is in terms of the depth of the convexly curved working surface, i.e. the depth of the spherical segment defined by the convexly curved working surface. Advantageous, the depth of the segment defined by the convexly curved working surface is at least 2 µm, 5 µm, or 10 µm and/or less than 100 µm, 80 µm, or 70 µm and/or within a range formed by any combination of these values.

The working surface can be a spherically symmetric curved surface. In the arrangement illustrated in FIGS. 1 and 2, the ATR crystal is in the form of a chamfered cylinder comprising two flat chamfered side walls forming the inlet and outlet surfaces, and an end surface of the chamfered cylinder forming the working surface. In this configuration, the end surface of the chamfered cylinder is processed to form the curved working surface of the ATR crystal.

A further feature of the ATR crystal illustrated in FIGS. 1 and 2 is a secondary chamfer surrounding the working surface. This secondary chamfer serves to reduce the surface area of the curved working surface thus increasing the pressure for a given force which can improve contact between the curved surface of the ATR crystal and the sample to be analysed.

The inlet surface, the outlet surface, and/or the working surface can be fabricated to have a surface roughness $R_a$ less than 30 nm, 20 nm, 15 nm, 10 nm, 5 nm, 2 nm, or 1 nm. Furthermore, the inlet surface, the outlet surface, and/or the working can be fabricated to a high fidelity, for example highly flat or precisely curved (the working surface being curved). As such, the inlet surface, the outlet surface, and/or the working surface may have a surface irregularity of ≤1 fringe @ 632.8 nm as measured relatively to a precisely flat or precisely curved target surface profile. Such characteristics provide good optical performance without deformation or scattering of the analysis beam. Preferably these characteristics of surface roughness and surface irregularity are provided over a majority of the surface area of the respective surfaces, e.g. over at least 50%, 60%, 70%, 80%, or 90% of the surface area of the respective surfaces.

Figure 3:
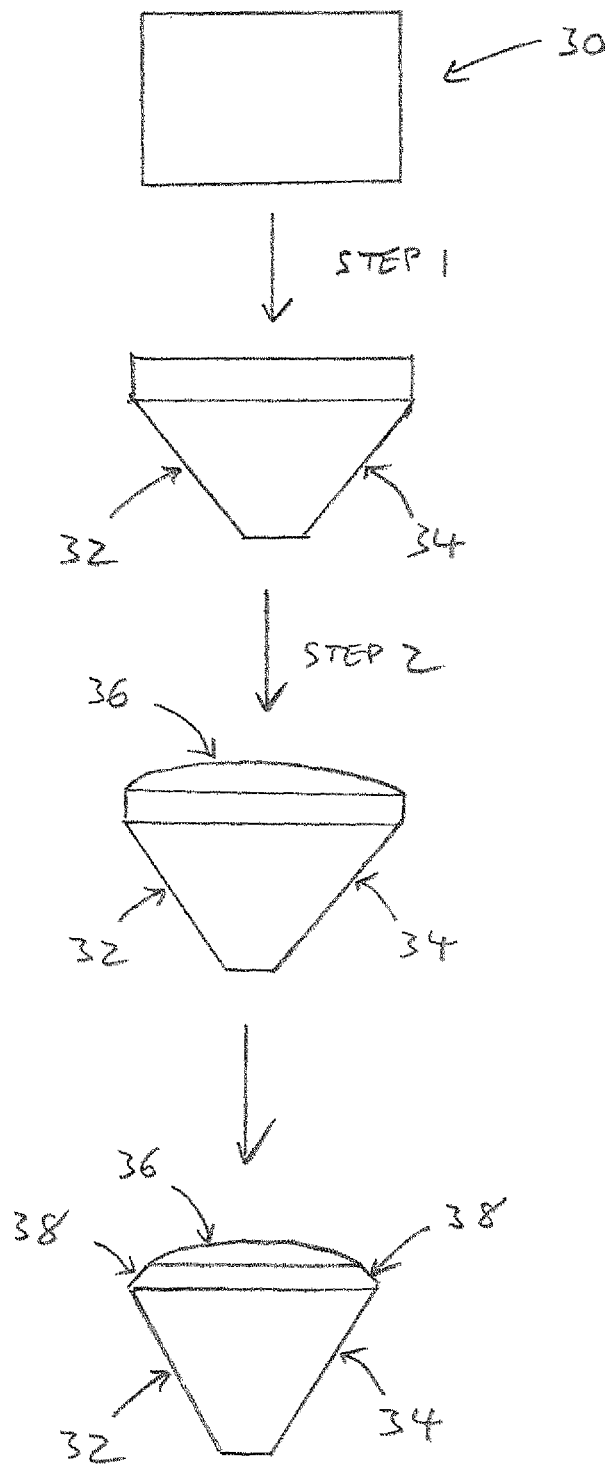
FIG. 3 illustrates the steps involved in fabricating the ATR crystal illustrated in FIGS. 1 and 2.

FIG. 3 illustrates the basic steps involved in fabricating the ATR crystal illustrated in FIGS. 1 and 2.

In step 1, a cylindrical piece of diamond material 30 is processed to form two flat chamfered surfaces 32, 34. This may be achieved via laser cutting, mechanical techniques such as lapping and polishing, chemo-mechanical polishing, or any other suitable technique. Advantageously surfaces 32, 34 are highly polished.

In step 2, an end of the cylinder is processed to form the curved working surface 36. Suitable methods for forming a curved surface in diamond material include laser turning and polishing using a polishing cup.

In step 3, the secondary chamfer 38 is formed around the curved working surface 36. This may be done using laser cutting, turning, or polishing.

In principle steps 1 to 3 could be performed in any order.

The diamond material used to fabricate the ATR crystal is preferably single crystal diamond material, more preferably type IIa diamond material, more preferably type IIa synthetic diamond material, and most preferably single crystal chemical vapour deposited (CVD) diamond material.

Figure 4:
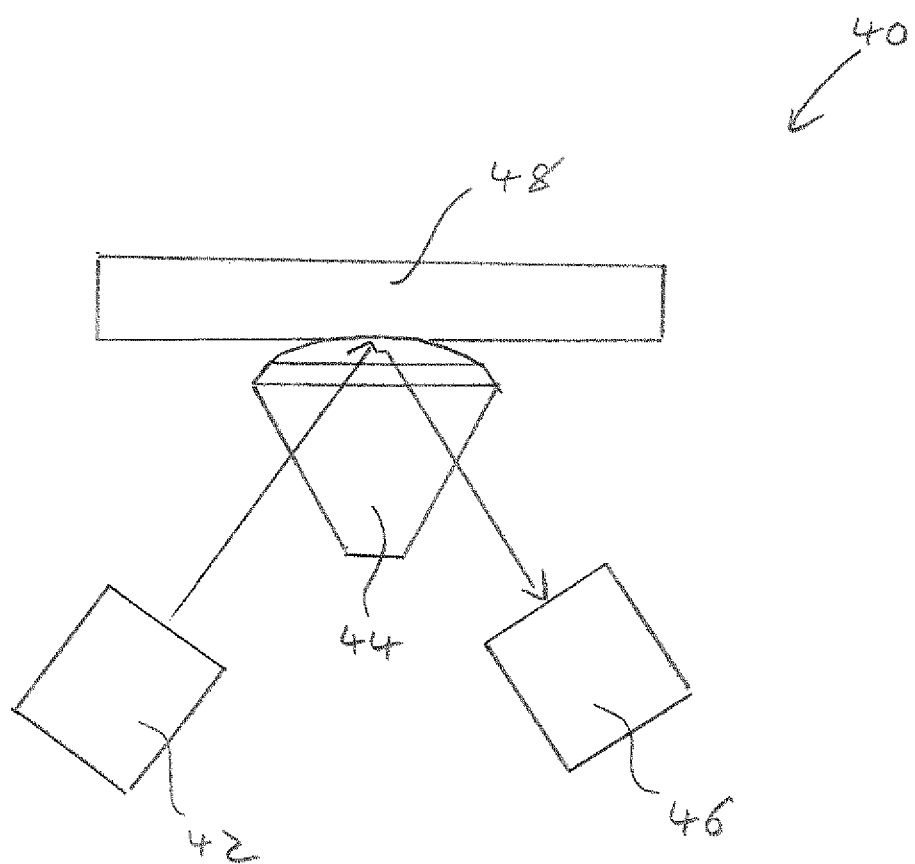
FIG. 4 illustrates the basic components and configuration of an ATR spectrometer comprising an ATR crystal according to an embodiment of the present invention.

FIG. 4 illustrates the basic components and configuration of an ATR spectrometer 40 comprising an ATR crystal according to an embodiment of the present invention. The ATR spectrometer comprises an infrared beam source 42, an ATR crystal 44, and a detector 46. The components are configured relative to each other such that in use the analysis beam is directed through the inlet surface of the ATR crystal to an inner side of the working surface in contact with a sample 48 to be analysed. The analysis beam is internally reflected at the inner side of the working surface in contact with the sample to be analysed such that the analysis beam passes out of the ATR crystal through the outlet surface to the detector.

Variations on the geometry of the ATR crystal can be envisaged. FIGS. 5(a) to 5(d) illustrate several alternative ATR crystal geometries according to embodiments of the invention in which: FIG. 5(a) illustrates a variant with a different chamfer geometry; FIG. 5(b) illustrates a variant in which the secondary chamfer is not provided; FIG. 5(c) illustrates a crystal configuration with a pointed base rather than a flat base; and FIG. 5(d) illustrates a variant with a rectangular curved surface rather than a spherical curved surface. These represent a non-exhaustive set of alternatives and while this invention has been particularly shown and described with reference to embodiments, it will be understood to those skilled in the art that various changes in form and detail may be made without departing from the scope of the invention as defined by the appended claims.

The invention claimed is:

1. An attenuated total reflection (ATR) crystal for ATR spectroscopy of a sample to be analysed,
   the ATR crystal being formed of a diamond material, and configured to have an inlet surface for an infrared analysis beam, an outlet surface for the infrared analysis beam, and a working surface for contacting the sample to be analysed, wherein the ATR crystal is in the form of a chamfered cylinder comprising two flat chamfered side walls forming the inlet and outlet surfaces, and an end surface of the chamfered cylinder forming the working surface;
   the inlet surface, the outlet surface and the working surface being configured such that in use the analysis beam can be directed through the inlet surface to an inner side of the working surface in contact with the sample to be analysed and internally reflected at the inner side of the working surface in contact with the sample to be analysed such that the analysis beam passes out of the ATR crystal through the outlet surface, and characterized in that the working surface is convexly curved, wherein the convexly curved working surface defines a segment having a depth in a range 2 to 100 µm.

2. An ATR crystal according to claim 1, wherein the working surface is spherically symmetric.

3. An ATR crystal according to claim 1, further comprising a secondary chamfer surrounding the working surface.

4. An ATR crystal according to claim 1, wherein the inlet surface, the outlet surface, and/or the working surface have a surface roughness $R_a$ less than 30 nm.

5. An ATR spectrometer comprising an infrared beam source, an ATR crystal according to claim 1, and a detector.

* * * * *